(12) United States Patent
Volbers et al.

(10) Patent No.: US 12,494,309 B2
(45) Date of Patent: Dec. 9, 2025

(54) WATER-BASED ALKALINE COMPOSITION FOR FORMING AN INSULATING LAYER OF AN ANNEALING SEPARATOR, COATED SOFT MAGNETIC ALLOY AND METHOD FOR PRODUCING A COATED SOFT MAGNETIC STRIP

(71) Applicant: Vacuumschmelze GmbH & Co. KG, Hanau (DE)

(72) Inventors: Niklas Volbers, Hanau (DE); Johannes Tenbrink, Hanau (DE); Markus Brunner, Hanau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 21 days.

(21) Appl. No.: 17/554,272

(22) Filed: Dec. 17, 2021

(65) Prior Publication Data
US 2022/0199304 A1   Jun. 23, 2022

(30) Foreign Application Priority Data

Dec. 18, 2020   (DE) .......................... 102020134300.0

(51) Int. Cl.
| | | |
|---|---|---|
| H01F 1/18 | (2006.01) |
| C08K 3/22 | (2006.01) |
| C09D 5/03 | (2006.01) |
| C09D 7/40 | (2018.01) |
| C09D 7/48 | (2018.01) |
| C09D 7/62 | (2018.01) |
| C09D 133/08 | (2006.01) |
| C09D 133/10 | (2006.01) |
| C21D 8/02 | (2006.01) |
| C22C 38/00 | (2006.01) |
| C22C 38/02 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/52 | (2006.01) |
| C22C 38/58 | (2006.01) |

(52) U.S. Cl.
CPC ................ *H01F 1/18* (2013.01); *C08K 3/22* (2013.01); *C09D 5/037* (2013.01); *C09D 7/48* (2018.01); *C09D 7/62* (2018.01); *C09D 7/67* (2018.01); *C09D 7/68* (2018.01); *C09D 133/08* (2013.01); *C09D 133/10* (2013.01); *C21D 8/0284* (2013.01); *C22C 38/002* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/58* (2013.01); *C08K 2003/2227* (2013.01); *C08K 2201/005* (2013.01); *C08K 2201/011* (2013.01); *C21D 2241/00* (2013.01)

(58) Field of Classification Search
CPC ....................................................... C09D 7/62
See application file for complete search history.

(56) References Cited

U.S. PATENT DOCUMENTS

| | | |
|---|---|---|
| 1,862,559 A | 6/1932 | White et al. |
| 2,717,223 A | 9/1955 | Binstock et al. |
| 2,992,952 A | 7/1961 | Assmus et al. |
| 3,065,118 A | 11/1962 | Wawrousek et al. |
| 3,078,198 A | 2/1963 | Wiener |
| 3,148,092 A | 9/1964 | Shull, Jr. |
| 3,166,408 A | 1/1965 | Chen |
| 3,240,638 A | 3/1966 | Wiener et al. |
| 3,282,747 A | 11/1966 | Foster et al. |
| 3,466,201 A | 9/1969 | Assmus et al. |
| 3,597,286 A | 8/1971 | Thornburg |
| 3,634,072 A | 1/1972 | Ackermann et al. |
| 3,695,944 A | 10/1972 | Stroble |
| 3,856,568 A | 12/1974 | Tanaka et al. |
| 3,868,278 A | 2/1975 | Foster et al. |
| 3,977,919 A | 8/1976 | Foster et al. |
| 4,367,100 A | 1/1983 | Miller, Jr. |

(Continued)

FOREIGN PATENT DOCUMENTS

| | | |
|---|---|---|
| DE | 1029845 B | 5/1958 |
| DE | 1049409 B | 1/1959 |

(Continued)

OTHER PUBLICATIONS

English machine translation of DE 10 2008 039 326 A1 of Zoch (Year: 2010).*

(Continued)

*Primary Examiner* — Jophy S. Koshy
(74) *Attorney, Agent, or Firm* — Dickinson Wright PLLC (57) ABSTRACT

There is provided a water-based alkaline composition for forming an insulating layer of an annealing separator on a soft magnetic alloy, this composition comprising ceramic particles with a particle size of less than 0.5 μm and at least one polymer dispersion as a binding agent, the polymer dispersion comprising one or more mixed polymerisates from the group made up of acrylate polymers, methacrylate polymers, polyvinyl acetate, polystyrene, polyurethane, polyvinyl alcohol, hydroxylated cellulose ether, polyvinyl pyrrolidone, and polyvinyl butyral, and having a pH value of between 8 and 12, preferably between 9 and 11.

26 Claims, 4 Drawing Sheets

(56) References Cited

U.S. PATENT DOCUMENTS

| | | | |
|---|---|---|---|
| 4,537,792 A | | 8/1985 | Kitayama et al. |
| 5,174,833 A | * | 12/1992 | Tanaka ................. C21D 8/1283 427/127 |
| 5,394,721 A | | 3/1995 | Iwayama et al. |
| 5,507,883 A | | 4/1996 | Tanaka et al. |
| 5,685,920 A | | 11/1997 | Tanaka et al. |
| 6,146,474 A | | 11/2000 | Coutu et al. |
| 6,423,156 B1 | | 7/2002 | Günther et al. |
| 6,685,882 B2 | | 2/2004 | Deevi et al. |
| 7,905,965 B2 | | 3/2011 | Gigliotti et al. |
| 8,943,677 B2 | | 2/2015 | Gerster et al. |
| 8,969,261 B2 | * | 3/2015 | Talingting Pabalan ..................... C08L 1/284 507/260 |
| 10,742,077 B2 | | 8/2020 | Volbers |
| 2004/0126483 A1 | | 7/2004 | Heimann et al. |
| 2005/0268994 A1 | | 12/2005 | Gerster et al. |
| 2008/0121315 A1 | | 5/2008 | Gigliotti et al. |
| 2011/0050376 A1 | | 3/2011 | Gerster et al. |
| 2012/0156441 A1 | | 6/2012 | Gerster et al. |
| 2017/0162295 A1 | | 6/2017 | Sashi et al. |
| 2018/0223401 A1 | | 8/2018 | Waeckerle et al. |
| 2019/0360065 A1 | | 11/2019 | Volbers et al. |
| 2020/0318212 A1 | | 10/2020 | Fohr et al. |
| 2020/0325564 A1 | | 10/2020 | Fohr et al. |
| 2020/0340088 A1 | | 10/2020 | Fohr et al. |
| 2022/0074011 A1 | | 3/2022 | Han et al. |

FOREIGN PATENT DOCUMENTS

| | | |
|---|---|---|
| DE | 1101471 B | 3/1961 |
| DE | 1106354 B | 5/1961 |
| DE | 1109197 B | 6/1961 |
| DE | 1115279 B | 10/1961 |
| DE | 1180954 B | 11/1964 |
| DE | 1483516 A1 | 2/1969 |
| DE | 2129930 A1 | 12/1971 |
| DE | 2247269 A1 | 4/1973 |
| DE | 3336448 A1 | 4/1984 |
| DE | 4238150 A1 | 5/1994 |
| DE | 19754996 A1 | 6/1999 |
| DE | 19750066 C1 | 8/1999 |
| DE | 102009038730 A1 | 1/2010 |
| DE | 102008039326 A1 | 2/2010 |
| DE | 102018112491 A1 | 5/2019 |
| EP | 0695812 A1 | 2/1996 |
| EP | 0824755 B1 | 1/2001 |
| EP | 0935008 B1 | 10/2002 |
| EP | 1145259 B1 | 12/2002 |
| EP | 1482072 A2 | 12/2004 |
| EP | 1475450 B1 | 11/2005 |
| EP | 3000915 A1 | 3/2016 |
| EP | 2791377 B1 | 7/2018 |
| EP | 3396022 A1 | 10/2018 |
| EP | 3396681 A1 | 10/2018 |
| EP | 3541969 A1 | 9/2019 |
| EP | 3730286 A1 | 10/2020 |
| GB | 2207927 B | 2/1991 |
| GB | 2492406 A | 1/2013 |
| GB | 2495465 A | 4/2013 |
| GB | 2550593 A | 11/2017 |
| JP | S6240344 A | 2/1987 |
| WO | 00/05733 A2 | 2/2000 |
| WO | WO-2005066288 A1 * | 7/2005 ......... B01D 67/0046 |
| WO | 2013/125790 A1 | 8/2013 |
| WO | 2014/180610 A1 | 11/2014 |
| WO | 2018/091169 A1 | 5/2018 |
| WO | 2020130643 A1 | 6/2020 |

OTHER PUBLICATIONS

English machine translation of WO 2005066288 A1 of Bolz (Year: 2005).*

Aspden, R.G. et al., "Anisotropic And Heterogeneous Nucleation During The Gamma To Alpha Transformation In Iron," Acta Metallurgica, vol. 16, Aug. 1968, 9 pages.

Krause, R.F. et al., "Magnetic properties of textured annealed commercial black plate," J. Appl. Phys., vol. 52, No. 3, Mar. 1981, 3 pages.

Sung, Jin Kyung et al., "Efficient Generation of Cube-on-Face Crystallographic Texture in Iron and its Alloys," ISIJ International, vol. 51, No. 2, 2011, 7 pages.

* cited by examiner

WATER-BASED ALKALINE COMPOSITION FOR FORMING AN INSULATING LAYER OF AN ANNEALING SEPARATOR, COATED SOFT MAGNETIC ALLOY AND METHOD FOR PRODUCING A COATED SOFT MAGNETIC STRIP

Water-based alkaline composition for forming an insulating layer of an annealing separator, coated soft magnetic alloy and method for producing a coated soft magnetic strip.

This U.S. patent application claims priority to DE Patent Application No. 10 2020 134 300.0, filed Dec. 18, 2020, the entire contents of which is incorporated herein by reference in its entirety.

BACKGROUND

1. Technical Field

The invention relates to a water-based alkaline composition for forming an insulating layer of an annealing separator on a soft magnetic alloy, for example, to a coated soft magnetic alloy and to a method for producing a coated soft magnetic strip.

2. Related Art

To optimise the magnetic properties of crystalline soft magnetic materials, it is common practice to provide these materials, taken in the form of continuous strips, with an electrically insulating surface coating that acts as an annealing separator before they are used to produce soft magnetic cores and parts by means of winding, punching, stacking or other techniques.

The primary purpose of this coating is to reliably prevent the fusing together or welding of individual strip layers during typical heat treatment processes at temperatures of around or above 1000° C. This welding creates electrical contacts between the individual strip layers of a soft magnetic part, and so inevitably leads to increased eddy-current-induced hysteresis losses. In addition, this welding results in mechanical damage when strip layers are subsequently separated. Since the heat treatment required to set or reset good soft magnetic properties must be carried out at temperatures of about or above 1000° C., generally in a reducing inert gas comprising pure hydrogen, the coating materials used, which have the necessary annealing separator function, are almost exclusively appropriately temperature-stable, generally ceramic materials.

As far as the type of coating is concerned, a basic distinction can be drawn between coatings that are produced from a solution of a coating-forming material and coatings in which particulate, where appropriate colloidally distributed or nanoparticulate, fillers in combination with appropriate additives and binding agents (binders) are applied to the strips to be coated.

One example of this first category of coatings made of solutions is the layer of zirconium oxide from an alcoholic zirconium oxide solution described in EP 1482072 A2. In the production of soft magnetic strips from SiFe metal-phosphate- and silicate-based coatings, as described in DE 2247269 A1, for example, can be used. An example of the use of nanoparticulate ceramic materials in combination with metal-phosphate-based binding agents is described in EP 3396681 A1.

These coatings have a typical layer thickness in the region of or significantly below 2 µm. According to the teaching of DE 10 2008 039 326 A1, significantly thicker coatings with layer thicknesses of up to approx. 20 µm can be achieved by the use of a sol-gel coating with a combination of organic siloxanes and with metal alcoholates or metal chelates.

There is, however, a need for alternative compositions that enable the formation of a coating that can be used both as an annealing separator and as an electrical surface insulator for soft magnetic alloys.

SUMMARY

According to the invention, a water-based alkaline composition is provided that can be used to form an insulating layer of an annealing separator on a soft magnetic alloy, for example. The water-based alkaline composition comprises ceramic particles with a particle size of less than 0.5 µm and at least one polymer dispersion as a binding agent, the polymer dispersion being made up of one or more or mixed polymerisates from the group consisting of acrylate polymers, methacrylate polymers, polyvinyl acetate, polystyrene, polyurethane, polyvinyl alcohol, hydroxylated cellulose ether, polyvinyl pyrrolidone and polyvinyl butyral, and having a pH value of between 8 and 12, preferably between 9 and 11.

For particular applications such as the particular heat treatment of alloys in the iron-cobalt-vanadium family to generate particularly magnetically advantageous cube-face textures, for example, there is, however, a need for coatings that neither cover the full surface of the strip to be coated nor adhere so firmly to the strip surface during or after heat treatment at the temperatures at which the desired cube-face texture is to be produced that they can only be removed by chemical or abrasive methods. It has been shown that without these two conditions the production of texture by the coating is impaired to such an extent that it is no longer possible to produce the desired to cube-face texture {001}<uvw> with an orientation of the magnetically easy axis <001> parallel to the sheet surface in a significant volume fraction of the soft magnetic material. In the case of a full-surface coating, in particular, the fraction of the magnetically unfavourable {111}<uvw> orientation is too high. The aim is to maintain the fraction of this unfavourable {111}<uvw> orientation below 13%, is preferably below 6%, in order to achieve high induction values, grains with a tilt of up to +/−10°, or even better up to +/−15°, compared to the nominal crystal orientation of the {111} planes being included.

With the water-based alkaline composition according to the invention, a coating that adheres very well to the coated strip at room temperature and allows standard forming method steps such as cutting, punching or bending, for example, without notable impairment, can be formed on a substrate such as a strip of an iron-cobalt-based soft magnetic alloy. However, if a certain temperature threshold is exceeded during the subsequent heat treatment process, adherence to the band surface is lost insofar as it only slightly sintered but can still be removed easily from the strip surface, for example by rubbing it with the finger.

Furthermore, the coating contains none of the components that encourage wear during machining such as ceramic particles with particle sizes>1 µm, for example. In order to allow reliable heat treatment without individual stacked or wound layers fusing together, even during annealing under mechanical load and in the presence of strip faults such as punching or cutting burrs, for example, the coating can be applied to the material to be coated within a thickness range of approx. 2 µm to 15 µm on each strip side, it being necessary to ensure at the same time that the coating can be structured such that only a maximum of 20% to 80% of the strip surface is covered with the coating.

Furthermore, the water-based alkaline composition is formulated such that no corrosion of the coated magnetic material occurs during the application of the coating, during drying or, of course, in the dried state of the alloys that consist substantially of iron.

In order to meet these requirements, an aqueous alkaline dispersion of a nanoparticulate ceramic material (metal oxides or metal hydroxides) in combination with polymer dispersions, water-soluble polymers or a combination of these two substance classes is provided as a temporary binding agent or a rheologically active component in order to form a suitable coating. In other words, a nanoparticulate ceramic material (metal oxides or metal hydroxides) in combination with polymer dispersions, water-soluble polymers or a combination of these two substance classes is provided as a temporary binding agent or a rheologically active component and provided as a dispersion in alkaline water.

Furthermore, the coating formulation can contain wetting and flow additives that ensure good substrate wetting and therefore ultimately good adherence of the dried coating. The acrylate-polymer-based dispersions proposed here as temporary binding agents represent just one of a variety of possible variants of the chemical compositions that can be used. Dispersions based on polyvinyl acetate, polystyrene, polyurethane or even directly water-soluble polymers such as polyvinyl alcohol, hydroxylated cellulose ether, polyvinyl pyrrolidone or polyvinyl butyral, for example, could in principle also be used. Adequate compatibility of the binding and thickening agents with the other components of the formulation and sufficiently good thermal degradability of the polymer are preferably ensured so that the coated material according to the invention can be fed directly to a heat treatment process in a reducing inert gas, in particular high-purity hydrogen, without the need for heat treatment beforehand in order to achieve the targeted removal of the organic components of the strip coating.

If the soft magnetic materials to be coated consist of at least 65% iron, and cobalt and vanadium, the other significant alloy components that it contains, are not suitable for producing corrosion-inhibiting passive layers on the surface of the material, and if water is the process medium, surface corrosion is prevented in so far as is technically possible by the appropriate selection of the pH value. This is achieved by selecting a pH value within the range of approx. 8 to 12, preferably 9 to 11, since it is in this range that alloys consisting substantially of iron are best protected against corrosion.

During the actual coating process, i.e. during the application and drying of the aqueous coating solution, values within this advantageous range of pH values can easily be achieved by the addition of aqueous ammonia. Once the coating has dried, and the aqueous ammonia has therefore necessarily been removed from the coating, it is possible to achieve permanent corrosion protection by the addition of an additive that is sufficiently non-volatile during the drying of the coated strip and has a permanently adequate pH value in the dried state of the coating. Particularly advantageous in achieving this purpose is the use of water-soluble alkanolamines that are compatible with the other components of the formulation such as 2-amino-2-ethyl-1,3-propanediol or 2-amino-2-methyl-1,3-propanediol, for example.

Various factors are taken into account in selecting the ceramic composition to act as the annealing separator. In addition to the requirement for adequate temperature resistance, chemical resistance in the alkaline range, particle size within a range of 0.02 µm to 0.5 µm and adequate stability of the colloidally dispersed sols produced, it is also of great benefit for the viscosity of the sols produced to be strongly dependent on the concentration of the disperse particles. This type of dependence results in a very strong increase in viscosity during the drying of the applied wet layer, thus making it possible to almost completely prevent the uncontrollable running of a coating applied in a structure.

Against this backdrop, the use of materials based on chemically surface modified boehmite that are dispersible in nanoparticulate form in the alkaline range has proved particularly successful. In contrast to the colloidal-silica-acid-based products often otherwise used for such applications, they exhibit a very strong dependence of dispersion viscosity on the concentration of the dispersed particles.

Aqueous dispersions of methacrylic-acid-ester-based polymerisates, where applicable in combination with acrylic acid esters, are used as temporary binding agents and rheologically active additives. These dispersions can be used to produce plastic films to be used as binding agents that have sufficient hardness, adherence and abrasion resistance to be used without difficultly with standard mechanical machining steps such as punching or cutting, for example. A further advantage of these polymers is their comparatively simple and low-residue thermal degradation due to depolymerisation at temperatures from approx. 400 to 450° C. As a result, it is possible to remove the organic components of the coating directly in hydrogen very largely without residue and so to prevent the carburisation of alloy strips coated in this manner, which would once again be associated with the impairment of the achievable magnetic properties.

Silicon-polyether-polymer-based surface-active flow agents that are stable in the alkaline range are used to promote the wetting of the strip surface to be coated, and so ultimately to achieve a coating that adheres well. These additives ensure that slight impurities of the strip surface to be coated, such as traces of rolling oil residues, for example, do not lead to wetting defects during the application of the water-based coating medium.

In some embodiments the polymer dispersion comprises methacrylic acid esters and optionally acrylic acid esters.

In some embodiments the ceramic particles comprise metal oxide hydrates or metal oxides or metal hydroxides.

In some embodiments the ceramic particles comprise a chemically surface modified boehmite.

In some embodiments the average particle size of the ceramic particles is between 10 nm and 300 nm, preferably between 20 nm and 150 nm, preferably between 10 nm and 90 nm. A smaller average particle size has the advantage that a pattern of coated regions with more precisely defined dimensions can be formed. The thickness of the coated regions can also be controlled more precisely.

In some embodiments the composition also comprises at least one rheological additive.

The rheological additive may comprise an acrylic- or and methacrylic-acid-ester-based polymer containing carboxyl groups that is water soluble in the alkaline range, i.e. soluble in alkaline water.

In some embodiments the rheological additive contains a hydroxylated cellulose is ether.

In some embodiments the rheological additive is contained in such quantities in the composition that the composition has a viscosity of greater than 100 Pa*s.

In some embodiments the binding agent has a temperature resistance of less than 500° C.

In some embodiments that contain a rheological additive this rheological additive has a temperature resistance of less than 500° C.

In some embodiments the composition also comprises at least one corrosion inhibitor. In some embodiments the corrosion inhibitor is a water-soluble alkanolamine such as 2-amino-2-ethyl-1,3-propanediol or 2-amino-2-methyl-1,3-propanediol, for example.

According to the invention, a coated soft magnetic alloy is provided in which, in the surface regions provided with the coating, the coating has a maximum application thickness of 1 µm to 15 µm, preferably 1.5 µm to 8 µm, preferably 1 µm to 6 µm, and comprises a composition according to any one of the preceding embodiments. This coated soft magnetic alloy is in the pre-heat-treatment state.

In some embodiments the soft magnetic alloy takes the form of a strip.

In some embodiments the soft magnetic alloy is completely covered by the coating.

In some embodiments 20% to 80% of the total surface of the soft magnetic alloy is free of the coating. Such an embodiment can be used with an FeCo-based soft magnetic alloy in order to enable or simplify the formation of a cube-face texture {001}<uvw>.

In some embodiments the soft magnetic alloy is planar and has the form of a strip or a sheet of a lamination with a first surface and a second, opposite surface, at least is between 20% and 80%, preferably between 30% and 70%, particularly preferably between 50% and 70%, of the first surface and between 20% and 80%, preferably between 30% and 70%, particularly preferably between 50% and 70%, of the second surface being free of the coating.

In some embodiments the coating is arranged on the soft magnetic alloy in the form of a pattern.

The pattern may comprise a regular arrangement of coated and uncoated, exposed regions. In some embodiments the pattern takes the form of stripes or dots or a network, the coated regions taking the form of stripes, dots or a grid.

In some embodiments the maximum width of the coated regions is less than 2 mm, preferably less than 1.2 mm, particularly preferably less than 0.8 mm. It has been found that this maximum width of the coated regions favours the formation of the cube-face texture.

The soft magnetic alloy to be coated typically takes the form of a strip with two opposing sides. In some embodiments the coating is arranged on one or on both sides.

In some embodiments between 80% and 20%, preferably between 70% and 30%, of the total surface of the soft magnetic alloy is free of the coating.

In some embodiments the soft magnetic alloy comprises one of the alloys from the group consisting of iron alloys with at least 99.5% Fe and smelting-induced to impurities, FeSi alloys with up to 5 wt % Si, NiFe alloys with 30% to 82 wt % Ni, and FeCo alloys with a Co content of between 4 wt % and 50 wt %.

In one embodiment the soft magnetic alloy has a composition consisting essentially of:

| 5 wt % | ≤ | Co | ≤ | 25 wt % |
|---|---|---|---|---|
| 0.3 wt % | ≤ | V | ≤ | 5.0 wt % |
| 0 wt % | ≤ | Cr | ≤ | 3.0 wt % |
| 0 wt % | ≤ | Si | ≤ | 3.0 wt % |
| 0 wt % | ≤ | Mn | ≤ | 3.0 wt % |
| 0 wt % | ≤ | Al | ≤ | 3.0 wt % |
| 0 wt % | ≤ | Ta | ≤ | 0.5 wt % |
| 0 wt % | ≤ | Ni | ≤ | 0.5 wt % |
| 0 wt % | ≤ | Mo | ≤ | 0.5 wt % |
| 0 wt % | ≤ | Cu | ≤ | 0.2 wt % |
| 0 wt % | ≤ | Nb | ≤ | 0.25 wt % |
| 0 wt % | ≤ | Ti | ≤ | 0.05 wt % |
| 0 wt % | ≤ | Ce | ≤ | 0.05 wt % |
| 0 wt % | ≤ | Ca | ≤ | 0.05 wt % |
| 0 wt % | ≤ | Mg | ≤ | 0.05 wt % |
| 0 wt % | ≤ | C | ≤ | 0.02 wt % |
| 0 wt % | ≤ | Zr | ≤ | 0.1 wt % |
| 0 wt % | ≤ | O | ≤ | 0.025 wt % |
| 0 wt % | ≤ | S | ≤ | 0.015 wt % | the rest iron, where Cr+Si+Al+Mn≤3.0 wt %, and up to 0.2 wt % of other smelting-induced impurities.

According to the invention a method for producing a coated soft magnetic alloy is also provided. The method comprises the following steps. A soft magnetic alloy is provided and coated with a water-based alkaline composition according to any one of the aforementioned embodiments. The coated soft magnetic alloy is heat treated, the coating thus forming an insulating layer made of ceramic particles that functions as to an annealing separator.

In some embodiments the soft magnetic alloy is completely covered by the coating.

In some embodiments the coating is applied to the soft magnetic alloy by dipping or is spraying.

In some embodiments the soft magnetic alloy is coated by applying a structure, wherein regions of the surface of the soft magnetic alloy are free of the structure.

In some embodiments the structure is formed by a pattern of stripes or dots or a network or a grid.

In some embodiments the coating or structure or pattern is applied to the soft magnetic alloy using profile rollers.

In some embodiments the maximum width of the coated regions is less than 2 mm, preferably less than 1.2 mm, particularly preferably less than 0.8 mm.

In some embodiments between 20% and 80%, preferably between 30% and 70%, of the total surface of the soft magnetic alloy remain free of coating before and after heat treatment.

In some embodiments the soft magnetic alloy takes the form of a lamination or a sheet or a strip that has a first surface and a second, opposing surface, at least between 20% and 80%, preferably between 30% and 70%, particularly preferably between 50% and 70%, of the first surface and between 20% and 80%, preferably between 30% and 70%, particularly preferably between 50% and 70%, of the second surface being free of the ceramic-forming layer.

In some embodiments after heat treatment the coating has a thickness in the regions provided with the coating of 0.5 µm to 15 µm, preferably 1.5 µm to 8 µm, preferably 1 µm to 6 µm. This thickness describes the thickness of the coating on one side of the soft magnetic alloy.

In some embodiments the soft magnetic alloy takes the form of a strip, and the coated soft magnetic alloy therefore also takes the form of a coated strip. A plurality of individual coated laminations is then formed from the coated strip by means of cutting, punching or laser cutting.

In some embodiments the laminations are stacked to form a stack and the stack is heat treated.

In some embodiments the laminations are joined together to form a laminated core and the laminated core is heat treated.

In some embodiments the laminations are joined together by means of welding, laser welding or in-die stacking to form a laminated core.

In some embodiments the soft magnetic alloy is heat treated at a temperature of above 650° C.

In some embodiments the soft magnetic alloy comprises one of the alloys from the group consisting of iron alloys with at least 99.5 wt % Fe and smelting-induced impurities, FeSi alloys with up to 5 wt % Si, NiFe alloys with 30% to 82 wt % Ni, and FeCo alloys with a Co content of between 4 wt % and 50 wt %.

In one embodiment the soft magnetic alloy has a composition consisting essentially of:

| | | | | |
|---|---|---|---|---|
| 5 wt % | ≤ | Co | ≤ | 25 wt % |
| 0.3 wt % | ≤ | V | ≤ | 5.0 wt % |
| 0 wt % | ≤ | Cr | ≤ | 3.0 wt % |
| 0 wt % | ≤ | Si | ≤ | 3.0 wt % |
| 0 wt % | ≤ | Mn | ≤ | 3.0 wt % |
| 0 wt % | ≤ | Al | ≤ | 3.0 wt % |
| 0 wt % | ≤ | Ta | ≤ | 0.5 wt % |
| 0 wt % | ≤ | Ni | ≤ | 0.5 wt % |
| 0 wt % | ≤ | Mo | ≤ | 0.5 wt % |
| 0 wt % | ≤ | Cu | ≤ | 0.2 wt % |
| 0 wt % | ≤ | Nb | ≤ | 0.25 wt % |
| 0 wt % | ≤ | Ti | ≤ | 0.05 wt % |
| 0 wt % | ≤ | Ce | ≤ | 0.05 wt % |
| 0 wt % | ≤ | Ca | ≤ | 0.05 wt % |
| 0 wt % | ≤ | Mg | ≤ | 0.05 wt % |
| 0 wt % | ≤ | C | ≤ | 0.02 wt % |
| 0 wt % | ≤ | Zr | ≤ | 0.1 wt % |
| 0 wt % | ≤ | O | ≤ | 0.025 wt % |
| 0 wt % | ≤ | S | ≤ | 0.015 wt % | the rest iron, where Cr+Si+Al+Mn≤3.0 wt %, and up to 0.2 wt % of other smelting-induced impurities.

This soft magnetic alloy has a phase transition from a BCC-phase region to a mixed BCC/FCC region to an FCC-phase region, wherein as the temperature increases the to phase transition between the BCC-phase region and the mixed BCC/FCC region takes place at a first transition temperature $T_{\alpha/\alpha+\gamma}$ and as the temperature increases further the transition between the mixed BCC/FCC region and the FCC-phase region takes place at a second transition temperature $T_{\alpha+\gamma/\gamma}$, where $T_{\alpha+\gamma/\gamma} > T_{\alpha/\alpha+\gamma}$.

In some embodiments, the difference $T_{\alpha+\gamma/\gamma} - T_{\alpha/\alpha+\gamma}$ is less than 45K, preferably less than 25K.

This soft magnetic alloy is preferably only partially coated so that between 20% and 80%, preferably between 30% and 70%, of the total surface of the soft magnetic alloy is free of the coating. If the alloy takes the form of a strip with two opposing main sides, the total surface is made up of the surfaces of the two main sides.

In this embodiment the following heat treatment is carried out in order to increase the fraction of the cube-face texture {001}<uvw> with an orientation of the magnetically easy axis <001> parallel to the sheet surface and to maintain the fraction of the magnetically unfavourable {111}<uvw> orientation below 13%, preferably below 6%, in order to achieve high induction values, grains with a tilt of up to +/−10°, or even better up to +/−15°, compared to the nominal crystal orientation of the {111} planes being included.

In one embodiment the coated soft magnetic alloy is heated and then heat treated in a first step for a total time $t_1$, in this first step the coated soft magnetic alloy being heat treated at a temperature within a temperature range of between $T_{\alpha+\gamma/\gamma}$ and $T_1$ and then cooled to room temperature.

In an alternative embodiment the coated soft magnetic alloy is heated and then heat treated in a first step for a total time $t_1$, in this first step the coated soft magnetic alloy being heat treated at a temperature within a temperature range of between $T_{\alpha+\gamma/\gamma}$ and $T_{1,\ and}$ then cooled to a temperature $T_2$, then heat treated in a second step at temperature $T_2$ for a time $t_2$ and then cooled to room temperature.

In both embodiments the heat treatment is carried out at least partially in a hydrogen-containing atmosphere, in the process the exposed parts of the surface of the partially coated soft magnetic alloy being in direct contact with the hydrogen-containing atmosphere, where $T_1 > T_2$, $T_1$ is above $T_{\alpha+\gamma/\gamma}$ and $T_2$ is below $T_{\alpha/\alpha+\gamma}$.

At least partially refers to time so that the heat treatment may be carried out over a time period in a hydrogen-containing atmosphere that is less than the entire time period of the heat treatment or during the entire time period of the heat treatment.

In some embodiments after heat treatment the alloy has a maximum surface fraction of a {111}<uvw> texture of 13%, preferably of 6%, grains with a tilt of up to +/−10°, or even better up to +/−15°, compared to the nominal crystal orientation of the {111} planes being included.

In some embodiments after heat treatment the alloy has a surface fraction of a {100}<uvw> texture (also known as cube-face texture) of at least 30%, preferably at least 50%, grains with a tilt of up to +/−15°, or even better up to +/−10°, compared to the nominal crystal orientation of the {100} planes being included.

In some embodiments the soft magnetic alloy takes the form of a plurality of stacked sheets that are weighted down with an additional weight and subjected to the heat treatment with the weight.

In some embodiments the soft magnetic alloy is subjected to a further final magnetic annealing process such that after cooling from $T_1$ to room temperature it is then heated from room temperature to $T_2$.

In some embodiments after heat treatment the soft magnetic alloy has:
 a maximum permeability $\mu_{max} \geq 6,000$ and/or an electrical resistance $\rho \geq 0.25\ \mu\Omega m$, hysteresis losses $P_{Hys} \leq 0.07$ J/kg at an amplitude of 1.5 T and/or a coercive field strength $H_c$ of ≤0.8 A/cm and/or an induction $B_{20} \geq 1.70$ T at 20 A/cm or
 a maximum permeability $\mu_{max} \geq 10,000$ and/or an electrical resistance $\rho \geq 0.25\ \mu\Omega m$ and/or hysteresis losses $P_{Hys} \leq 0.06$ J/kg at an amplitude of 1.5 T and/or a coercive field strength $H_c$ of 0.5 A/cm and an induction $B_{20} \geq 1.74$ T at 20 A/cm.

BRIEF DESCRIPTION OF THE DRAWINGS

Examples and embodiments are explained in greater detail below with reference to the drawings.

DETAILED DESCRIPTION

In some embodiments, the coating is used for a strip or part made of the crystalline soft magnetic Fe—Co—V alloy consisting of 17.25% Co, 1.49% V, 0.23% Si and 0.1% Mn, which is commercially available from Vacuumschmelze GmbH & Co. KG under the trade name VACOFLUX X1, is to be subjected to final annealing in order to set its magnetic properties. The purpose of the heat treatment is to recrystallise the cold-formed structure and then for grain growth to take place in order to improve the magnetic properties. However, the coating may be used for other types of soft magnetic materials.

It is particularly advantageous if this type of heat treatment also sets a magnetically advantageous preferred direction of the crystallites. It is possible with the named composition to set a cube-face texture {001}<uvw> by annealing in the γ region followed by tertiary recrystallisation during cooling. In an Fe-based alloy system with a positive crystal anisotropy constant $K_1$ the magnetically easy cube edge <001> is in the sheet plane and the magnetically hard space diagonal <111> is rotated out of the sheet plane. This results in increased induction B(H), in particular within an average field strength H range of 3 to 100 A/cm, thereby making it possible to produce electric motors with higher torque or a more compact design.

Tables 1 and 2 show the magnetic parameters of various embodiments, which were all subjected to the same heat treatment but differ in terms of the coating used.

Parameters B3, B20 and B100 correspond to induction at 3 A/cm, 20 A/cm and 100 A/cm respectively. Together with maximum permeability $\mu_{max}$, they characterise the static initial magnetization curve. For applications in electrical machines these to parameters should be as high as possible. Remanence $B_r$ corresponds to the remanent induction of the material following magnetisation of $H_{max}$=160 A/cm and is a measure of the rectangularity of the hysteresis loop. As with all soft magnetic materials, the coercive field strength $H_c$ should be as low as possible in order inter alia to minimise hysteresis losses.

The assessment of the soft magnetic properties also provided in Tables 1 and 2 is based on the magnetic characteristics expected of the named composition. "Adequate" magnetic characteristics exist where maximum permeability is at least 6,000 but the induction value B20 is below 1.70 T. In this case there is a significant fraction of (111) orientation. "Good" magnetic characteristics exist where the induction value B20 is between 1.70 T and 1.74 T. With this material, increased induction is achieved due to the presence of a cube-face texture {001}<uvw> or the suppression of the magnetically unfavourable preferred direction <111> parallel to the sheet plane. "Very good" magnetic characteristics exist where induction B20 is above 1,74 T as a result of very high fractions of cube-face texture.

Tables 1 and 2 also provide an assessment of sheet quality after annealing. Adequate layer separation is the necessary criterion for the manufacture of parts. "Very good" sheet quality exists where the sheets can be separated from one another after annealing without additional effort, there is no fusing together and the sheet surface has no indentations. It may also be possible to separate the sheets from one another without deformation despite the continued presence of adhesions on individual sheets. "Inadequate" sheet quality means that adjacent sheets have fused together at certain points or over certain areas, or that sheets have fused together at punching or cutting burrs and cannot be separated without visible damage, or that separation is impossible, or that the sheets exhibit clear indentations.

TABLE 1

| Example | R/Inv | Coating | $\mu_{max}$ | B3 in T | B20 in T | B100 in T | $B_r$ in T | $H_c$ in A/m | Magnetic characteristics | Sheet quality |
|---|---|---|---|---|---|---|---|---|---|---|
| A | R | Uncoated | 12,814 | 1.537 | 1.770 | 2.020 | 1.43 | 37.3 | Very good | Inadequate |
| B | R | HITCOAT, both sides | 10,240 | 1.437 | 1.687 | 1.963 | 1.36 | 46.4 | Sufficient | Inadequate |
| C | R | HITCOAT, one side | 12,467 | 1.493 | 1.737 | 2.001 | 1.39 | 39.8 | Good | Inadequate |
| D | Inv | TX1, 4% with add. | 13,937 | 1.510 | 1.743 | 2.008 | 1.41 | 38.0 | Very good | Very good |
| E | Inv | TX1, 7% without add. | 12,148 | 1.437 | 1.696 | 1.956 | 1.38 | 46.7 | Adequate | Very good |
| F | Inv | TX1, 7% with add. | 12,694 | 1.493 | 1.727 | 1.995 | 1.40 | 40.8 | Good | Very good |
| G | Inv | TX1, 11% without add. | 11,417 | 1.406 | 1.663 | 1.940 | 1.38 | 48.1 | Adequate | Very good |
| H | Inv | TX1, 11% with add. | 12,959 | 1.502 | 1.732 | 1.995 | 1.41 | 42.2 | Good | Very good |

TABLE 2

| Example | R/Inv | Coating | $\mu_{max}$ | B3 in T | B20 in T | B100 in T | $B_r$ in T | $H_c$ in A/m | Magnetic characteristics | Sheet quality |
|---|---|---|---|---|---|---|---|---|---|---|
| I | R | Uncoated | 14,856 | 1.566 | 1.793 | 2.039 | 1.38 | 31.6 | Very good | Inadequate |
| J | Inv | TX1 6% (1x) | 13,128 | 1.476 | 1.726 | 1.996 | 1.39 | 38.4 | Good | Very good |
| K | Inv | TX1 6% (2x) | 11,825 | 1.436 | 1.692 | 1.966 | 1.38 | 43.1 | Adequate | Very good |
| L | Inv | TX1 6% (3x) | 10,965 | 1.402 | 1.662 | 1.940 | 1.35 | 45.8 | Adequate | Very good |
| M | Inv | TX1 4% | 13,742 | 1.485 | 1.731 | 2.000 | 1.40 | 37.5 | Good | Very good |

Table 1 provides a summary of the magnetic parameters and layer separation of states according to the invention (Inv) and of reference states (R).

A different coated strip was used for each embodiment and sample rings measuring 28.5 mm×20.0 mm were punched from each of them. For the heat treatment, 10 to 20 rings were stacked on a flat base plate and the stack of rings weighted down with a covering plate. Annealing took place at 1000° C. with a dwell time of 4 h in dry hydrogen. The annealing temperature was selected so that annealing took place in the austenitic γ region. According to the DSC measurement ($1^{st}$ onset heating), the α+γ→γ phase transition in the example composition takes place at 969° C., the dwell step is therefore reliably in the γ region with an annealing temperature of 1000° C. and it is in principle possible to set the desired texture.

Sample A represents the uncoated reference sample. These sheets cannot be is annealed in direct contact with one another due to the lack of coating. A coarse ceramic powder that only partially covers the surface was therefore used as an annealing aid. Owing to the exposed surface, it is here that the highest fraction of cube-face texture {001}<uvw> can be formed during annealing. Induction B20 is at 1.770 T, i.e. the magnetic properties are very good. However, the self-weight of the sheets presses the powder into the surface during annealing, resulting in inadequate surface quality.

Sample B represents the reference sample with a continuous surface coating. The strip was first coated on both sides with HITCOAT, a zirconium-propylate-based coating according to EP 1482072, that is present after final annealing as ceramic zirconium oxide. During annealing, however, the small thickness of the coating in the region of less than 1 μm results in the sheets fusing together owing to technically unavoidable cutting burrs. Since the entire surface is covered, the preferred formation of a cube-face texture does not take place. This is expressed in a very low induction B20 of 1.687 T, i.e. a magnetic quality that is merely adequate.

Sample C is a reference sample similar to sample B, the HITCOAT coating being present on one side only, i.e. on one side of the strip only. To achieve this, during the coasting of the strip the coating solution on one side of the strip was completely squeezed out using a squeeze roller. The exposed surface on one side of the strip results in the formation of favourable texture fractions during the annealing process, resulting in a high induction B20 of 1.737 T. Layer separation nevertheless remains inadequate in this embodiment. Firstly, adhesions of the HITCOAT coating on the nominally uncoated side mean that the sheets have to be separated painstakingly by hand and this can lead to creases depending on the sheet thickness. Secondly, the layer is so thin that the sheets can fuse together at punching edges, which can be a few μm high.

Sample D is a state according to the invention in which the strip was coated on both sides with a coating designated TX1. The coating agent was produced using the following individual components:

| | | |
|---|---|---|
| 4 wt % | Disperal HP 14/7 | as AlO(OH)-based annealing separator |
| 12 wt % | Plextol M 628 | as Binding agent |
| 1.3 wt % | Rohagit SD 15 | as Thickening agent |
| 0.3 wt % | Dow Corning 500 Additive | as Wetting agent |
| 1.3 wt % | Ammonia solution (25%) | pH corrector |
| Rest | Deionised water | |

First, the necessary quantity of deionised water is placed in a container. While stirring continuously, the Disperal powder, which is a boehmite chemically modified on the particle surface and which therefore becomes dispersible in nanoparticulate form in the alkaline range, is then added to form a homogenous slurry. The Plextol, Rohagit and the 500 Additive wetting agent are then added, while stirring continuously. Once everything is homogenously distributed in the water, the aqueous ammonia solution is added to increase the pH value of the mixture to a value of approx. 10. Reaching this pH value results, on one hand, in the neutralisation of the acid Rohagit SD 15 thickening dispersion and the formation of a water-soluble polyacrylate and, on the other, in the chemical disintegration of the boehmite powder, which is distributed as a sol in the formulation up to approximately the size of the primary crystallites.

This coating solution is applied to the strip to be coated by means of profiled squeeze rollers in a continuous process and then dried with hot air heated to 280° C., strip temperatures of between 100° C. and 200° C. being reached for drying.

The profiled squeeze rollers are steel rollers with a rubber surface, for example, that are provided with a coat of polyurethane a few millimetres thick with a Shore hardness of 30 and 50 ShoreD, for example, into the surface of which is cut a thread-like structure with a depth of between 20 and 200 μm, for example, and a thread pitch of 0.15 mm to 1 mm, for example. The coating thickness achieved after application and drying is controlled by the depth of this structure and the concentration of the solution used for coating, while the fraction of the uncoated, exposed surface is controlled by the thread pitch and so by the distance between the line-type structures applied.

It goes without saying that this example of thread-like surface structuring is just one of a variety of possible examples and should not therefore be seen as an exclusive criterion. This manner of geometrical structuring does not play a significant role in the present invention. What is important is the ratio of coated to uncoated strip surface and the observance of a minimum coating thickness.

Since both the thickening dispersion and the dispersed boehmite itself produce a marked structural viscosity, shear thinning of the coating solution occurs upon application. However, viscosity increases sharply again immediately after application with the result that the coating does not run to form a flat application, and a negative image of the structure of the coating roller is obtained as the coating. It is therefore possible to define the fraction of coated strip surface from the structure of the coating roller without difficulty. The profiled roller used for this embodiment had a diameter of 70 mm and was profiled by means of a thread with a pitch of 0.60 mm and a profile depth of 135 μm.

Under these conditions, the structure produced left approx. 40% of the strip surface uncoated, the coated regions having a layer thickness of up to 4 μm on each side of the strip. The appearance of the coating corresponds to stripes running the length of the strip. After coating and drying, adherence of the coating is very good. A strip coated in this manner can readily be cut on circular shears, for example, and punched parts can be produced from the strip once it has been cut to its final width.

After final annealing the sample obviously has a very good magnetic induction B20 of 1.743 T, which is indicative of the formation of a cube-face texture. At the same time, the sheets can be separated from one another without difficulty and no manual separation of the individual lamination sheets is necessary. After annealing the to coating adheres sufficiently well due to the slight sintering and withstands further handling of the sheets. However, it can easily be rubbed off with a finger.

Sample E represents a modification according to the invention of the coating from sample D. Here, the ceramic fraction was increased to 7% and the thickening agent Rohagit was omitted. As a result, the coating solution had the following composition:

| 7 wt % | Disperal HP 14/7 | as annealing separator |
| 12 wt % | Plextol M 628 | as binding agent |
| 0.3 wt % | Dow Corning 500 Additive | as wetting agent |
| 1.3 wt % | Ammonia solution (25%) | pH corrector |
| Rest | Deionised water | |

Owing to the overall comparatively low viscosity of approx. 8 Pa s thus achieved and to the simultaneous lack of structural viscosity, the coating no longer appeared as a striped application, but was spread evenly over the strip surface. As a result no more than 10% of the strip surface was uncoated. Layer separation of the sheets was nevertheless perfect with this coating variant, i.e. there was no adhesion between sheets. In this example, it was possible to set "adequate" magnetic characteristics for the alloy system under consideration owing to the lack of exposed surface, i.e. induction B20 was only 1.696 T. Since the thickening additive missing from this formulation makes a non-flat coating impossible but has no effect on the adhesive strength of the coating before annealing, here too the coating exhibits very good adherence after coating and drying. A strip coated in this manner can be cut easily on circular shears, for example, and punched parts can be produced from the strip once it has been cut to its final width. After annealing the coating adheres sufficiently well due to the slight sintering and withstands the further handling of the sheets. However, it can easily be rubbed off with a finger.

In sample F the formulation from sample E with the same ceramic fraction of 7% was supplemented by a thickening agent to give the following overall formulation:

| 7 wt % | Disperal HP 14/7 | as annealing separator |
| 11 wt % | Plextol M 628 | as binding agent |
| 1.3 wt % | Rohagit SD 15 | as thickening agent |
| 0.3 wt % | Dow Corning 500 Additive | as tetting agent |
| 1.3 wt % | Ammonia solution (25%) | pH corrector |
| Rest | Deionised water | |

The appearance here is of a non-flat surface, similar to example D. By using a profiled roller with a similar configuration to the roller used in example D but a lower pitch of only 0.35 mm, i.e. with a smaller distance between adjacent grooves. This results in an appearance in which the lines no longer run parallel to the strip edge, but diagonally to it, some with ramifications. Approx. 60% to 70% of the surface remains uncoated. Here, too, there are many gaps in the coating. After annealing the sheets can be separated from one another without causing any damage. The still abundant exposed regions allow the formation of advantageous texture components, and an induction value B20 of 1.727 T is reached, which equates to good magnetic quality. After coating and drying, coating adherence is very good. A strip coated in this manner can be cut easily on circular shears, for example, and punched parts can be produced from the strip once it has been cut to its final width. After annealing the coating adheres sufficiently well due to the slight sintering and withstands the further handling of the sheets. However, it can easily be rubbed off with a finger.

The strip for sample G was coated with a coating according to the invention with a ceramic fraction of 11% and no additional thickening additive. The composition of the coating is therefore:

| 11 wt % | Disperal HP 14/7 | as annealing separator |
| 17 wt % | Plextol M 628 | as binding agent |
| 0.1 wt % | Dow Corning 500 Additive | as wetting agent |
| 1.2 wt % | Ammonia solution (25%) | pH corrector |
| Rest | Deionised water | |

The appearance on the strip is of a full-surface coating and the surface fraction of uncoated material is significantly below 10%. Though the full-surface coating leads to very good layer separation in final annealing, with the alloy selected it also simultaneously suppresses the formation of the desired crystallographic orientations. Accordingly, induction B20 is comparatively low at 1.663 T, i.e. magnetic quality is assessed as adequate.

For sample H according to the invention the coating solution from example G was supplemented by a thickening additive, giving an overall formulation of:

| 11 wt % | Disperal HP 14/7 | as annealing separator |
| 16 wt % | Plextol M 628 | as binding agent |
| 1.3 wt % | Rohagit SD 15 | as thickening agent |
| 0.1 wt % | Dow Corning 500 Additive | as tetting agent |
| 1.2 wt % | Ammonia solution (25%) | pH corrector |
| Rest | Deionised water | |

This modification in viscosity is able to partially prevent the coating from running. This results in stripes that are relatively wide compared to those in example D. Accordingly, approx. 30% to 50% of the surface remains uncoated. Final annealing is therefore successful, i.e. the sheets are very easy to separate. Despite the already relatively thick stripes, heat treatment sets good magnetic characteristics with an induction B20 of 1.732 T due to the exposed regions of the surface. After coating and drying, adherence of the coating is very good. A strip coated in this manner can be cut easily on circular shears, for example, and punched parts can be produced from the strip once it has been cut to final width. After annealing the coating adheres sufficiently well due to the slight sintering and withstands the further handling of the sheets. However, it can easily be rubbed off with a finger.

Table 2 provides a summary of magnetic parameters and layer separation for a further comparative example (R) and four further examples according to the invention (Inv).

Sample I is a reference example of the uncoated strip that was used for the further embodiments J, K and L. The VACOFLUX X1 alloy strip has a strip thickness of 0.20 and a composition of 17.15 wt % Co, 1.49 wt % V, 0.23 wt % Si, 0.11 wt % Mn, and the rest Fe. As with samples A to H in Table 1, a different coated strip was used for each embodiment and sample rings measuring 28.5 mm×20.0 mm were punched from each of them. For the heat treatment, 10 to 20 rings were stacked on a flat base plate and the stack of rings weighted down with a covering plate. Final annealing took is place at 1000° C. with a dwell time of 4 h in dry hydrogen. The annealing temperature was selected so that annealing took place in the austenitic γ region. According to the DSC measurement (1$^{st}$ onset heating), the α+γ→γ phase transition in the example composition takes place at 969° C., the dwell step is therefore reliably in the γ region with an annealing temperature of 1000° C. and it is in principle possible to set the desired texture.

The heat treatment of the uncoated sample rings was carried out in ceramic annealing powder that served as an annealing separator in order to prevent the rings from fusing together. As sample I had no coating, the hydrogen was able to reduce the surface sufficiently during annealing and the desired cube-face texture was set during cooling in the passage through the two-phase region (α+γ). Accordingly, the values recorded for the magnetic characteristics measured in the strip plane were very good. The disadvantage of this method is that it cannot be used to produce flat sheets. In addition, the annealing powder may form indentations. Sheet quality is therefore evaluated as inadequate.

For coating variant J according to the invention, an alternative composition was tested in which all the components of the formulation used in embodiment H were retained except the Rohagit SD 15 dispersion acting as a rheological additive and the necessary rheological properties were set by the addition of a delayed-solubility methyl hydroxyethyl cellulose.

Coating formulation J had the following composition:

| | | |
|---|---|---|
| 6 wt % | Disperal HP 14/7 | as annealing separator |
| 10 wt % | Plextol M 628 | as binding agent |
| 0.8 wt % | Tylose MH 30000 YP4 | as thickening agent |
| 0.1 wt % | Dow Corning 500 Additive | as wetting agent |
| 1.2 wt % | Ammonia solution (25%) | pH corrector |
| Rest | Deionised water | |

First, the necessary quantity of deionised water is placed in a container. The Disperal powder, which is a boehmite chemically modified on the particle surface that therefore becomes dispersible in nanoparticulate form in the alkaline range, and the Tylose, also in powder form, are then added while stirring continuously to form a homogenous slurry. The Plextol M 628 and 500 Additive wetting agent are then added, stirring continuously. Once everything is homogenously distributed in the water, the aqueous ammonia solution is added to increase the pH value of the mixture to a value of approx. 10. When this pH value is reached, the solubility-delaying properties of the Tylose are increased and the Tylose is brought into solution. In parallel there occurs the chemical disintegration of the boehmite powder, which is distributed as a sol in the formulation up to approximately the size of the primary crystallites. The viscosity of the coating increases very sharply within a few minutes as a result of these two effects and reaches a stable final state suitable for further processing in no more than 30 minutes.

This coating solution is then applied to the strip to be coated by means of profiled squeeze rollers in a continuous process and then dried with hot air heated to 280° C., the strip temperatures reaching between 100° C. and 200° C. for drying.

Here the fraction of coated or uncoated strip surface can be set using the process used in the embodiments described above by selecting an appropriate roller profile for the squeeze rollers.

Coating solution J proved to be particularly suitable since the solution is for the most part prevented from running following exit from the rolling gap and the desired coating profile (e.g. longitudinal stripes) can therefore be set very accurately.

Figure 3:
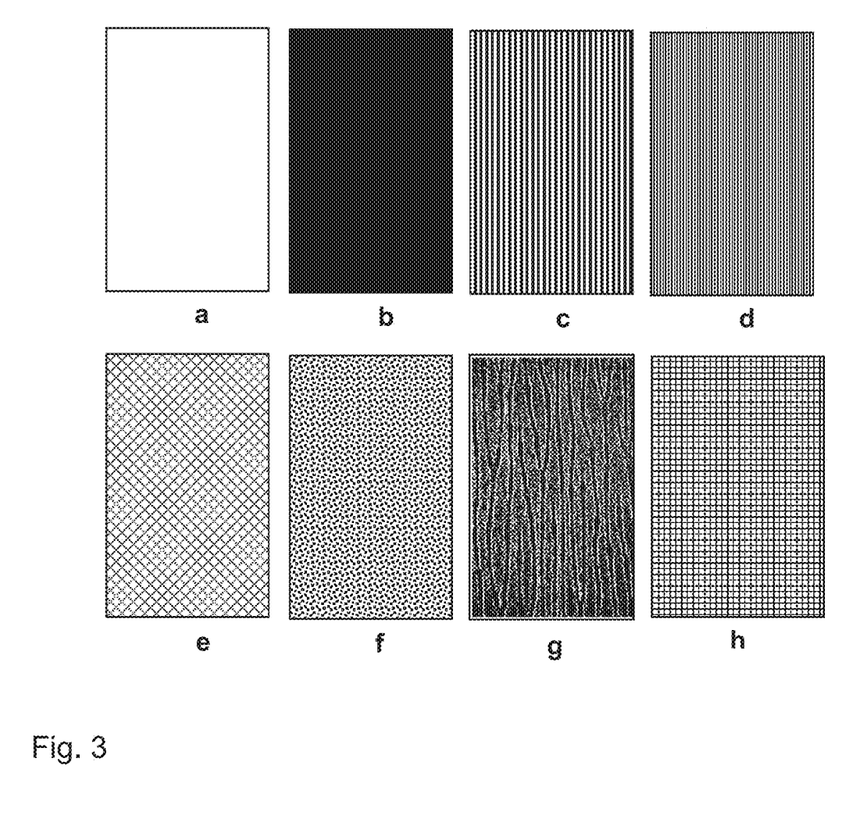
FIG. 3 shows schematic views of various surface patterns with which a soft magnetic alloy can be partially coated.

The coating produced using this approach has a striped profile similar to that shown in images c and d in FIG. 3. A quantitative evaluation of the Al content using EDX gave a surface fraction of 50%.

The annealing of the sample rings produced from the strip was carried out as for all coated examples in a stacked set-up lightly weighted down by a ceramic plate. Despite this weighting down and the higher temperatures of 1000° C., layer separation was perfect due to the presence of the coating and the sheets were flat after annealing due to the annealing set-up. The magnetic parameters were similarly evaluated as good. This was the result of the partial coating of the surface which permitted the formation of a cube-face texture magnetically advantageous in the strip plane during final magnetic annealing under the influence of hydrogen.

With sample K according to the invention the same coating solution as in example J was selected. However, the strips were recoated by hand with the same coating solution. The stripe pattern of the second coating application was applied at right angles to the rolling direction, resulting overall in a check pattern similar to coating image h in FIG. 3. The surface covering of Al increased to a fraction of 70% due to the repeated application. Due to this stronger surface covering the magnetic parameters that could be achieved by final annealing deteriorated and the induction value B20 of 1.692 T was evaluated as merely adequate. Layer separation continued to be very good, however, and sheet quality was therefore also evaluated as very good.

Sample L was also prepared with the coating solution from example J. The strip was recoated twice by hand, resulting in a triple application of the coating. This repeated application resulted in a very dense surface covering, as is clear from the high surface fraction of Al of 90%. After final annealing in a stack, ring samples made of this material show very good layer separation but only adequate induction B20 at 1.662 T.

Sample M was produced with the same coating solution as sample D, i.e. with a boehmite fraction of 4 wt % and the use of Rohagit SD 15 as a thickening agent. The to resulting coating image showed ramifications similar to those in reference pattern g in FIG. 3. The surface fraction of aluminium determined by EDX was 43%.

The correlation between surface fraction and magnetic characteristics was examined. Table 3 indicates the optical appearance of the coating, the corresponding reference pattern from FIG. 3 and the surface fraction $A_{Al}$ of the Al content determined by EDX for the five embodiments I, J, K, L and M as a measure of coverage with the coating. The two magnetic parameters B20 and Hc correspond to the parameters measured on sample rings after final annealing, as also indicated in Tables 1 and 2.

TABLE 3

| Example | R/Inv | Appearance | Pattern | $A_{Al}$ in % | B20 in T | $H_c$ in A/m |
|---|---|---|---|---|---|---|
| I | R | Uncoated | a | 0 | 1.793 | 31.6 |
| J | Inv | Stripes | d | 50 | 1.726 | 38.4 |
| K | Inv | Checked pattern | h | 70 | 1.692 | 43.1 |
| L | Inv | Almost full coverage | b | 90 | 1.662 | 45.8 |
| M | Inv | Ramifications | g | 43 | 1.731 | 37.5 |

Table 3 indicates the appearance, the corresponding reference pattern of the coated regions, the surface coverage and, in addition, the magnetic parameters B20 and Hc for embodiments I to M in Table 2.

The five examples therefore represent the uncoated reference state I and four embodiments according to the invention J, K, L and M with a surface fraction of the coating of between 43% and 90%.

Figure 4:
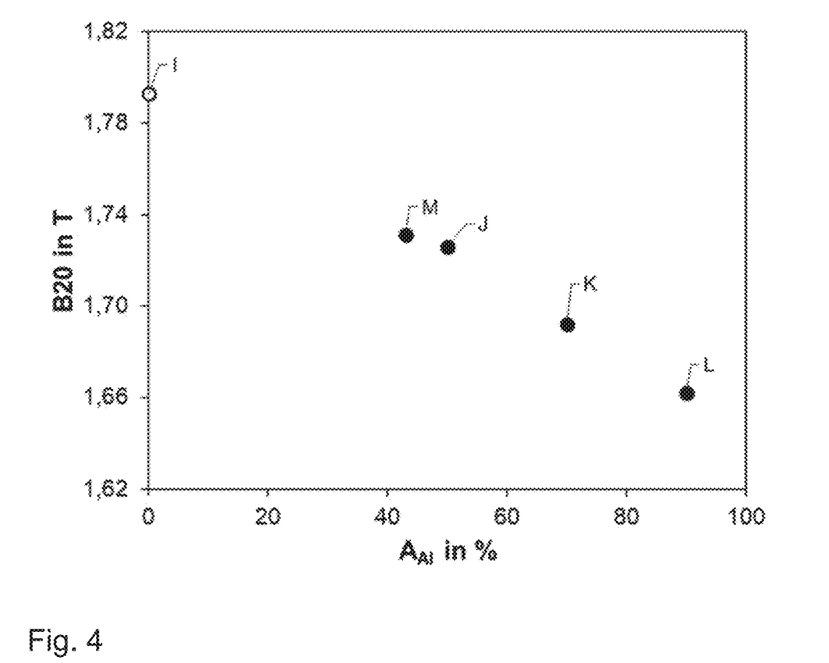
FIG. 4 shows a graph of magnetic induction B20 (B20=B (20 A/cm)) after final annealing as a function of the Al surface fraction $A_{Al}$.

FIG. 4 shows magnetic induction B20 (B20=B(20 A/cm)) after final annealing as a function of the Al surface fraction $A_{Al}$ as a result of the Al-containing coating. Measurements are carried out using EDX and the surface fraction of Al is evaluated. For applications in electrical machines, for example, it is desirable to set the highest possible induction since this makes it possible to produce machines with high power density.

The highest induction values are obtained without a coating with a surface fraction of 0%. As already explained, however, this state is not suitable for an industrial process for annealing sheets. By using the coating according to the invention it is possible to set a partial surface coverage in a targeted manner such that the desired cube-face texture is set on part of the surface and a higher induction B20 is achieved than would be possible with a full-surface coating. This both ensures a good layer separation and sets the highest possible induction.

Figure 5:
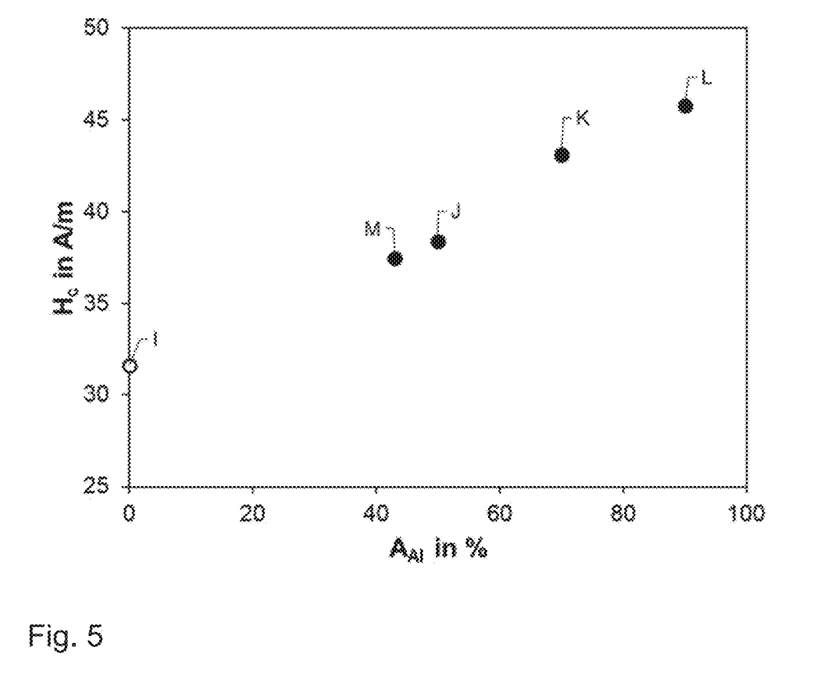
FIG. 5 shows a graph of coercive field strength $H_c$ after final annealing as a function of the Al surface fraction $A_{Al}$.

In addition, FIG. 5 shows coercive field strength $H_c$ after final annealing as a function of surface coverage by the Al-containing coating $A_{Al}$. Measurements are carried out by EDX with the surface fraction of Al being evaluated. The lowest possible coercive field strength is sought for applications in electrical machines, for example, since this reduces the hysteresis fraction of remagnetisation losses and increases the efficiency of the machine.

Here, too, the advantage of the coating according to the invention becomes apparent. By setting surface fractions of the coating at between 20% and 80%, for example, it is possible to achieve lower coercive field strengths than can be expected with a completely covered sample with a coverage of 100%. At the same time, this coverage is adequate to ensure reliable layer separation after final annealing.

Figure 6:
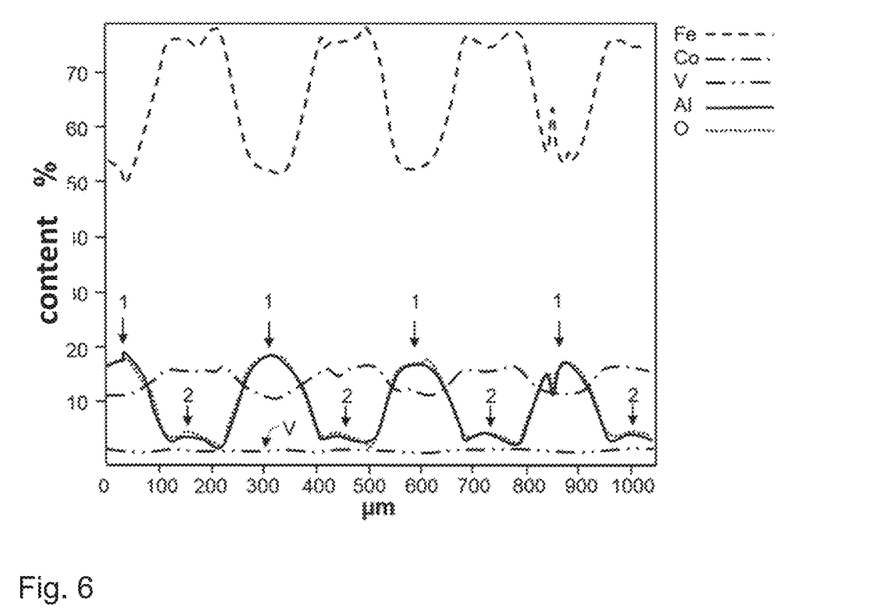
FIG. 6 shows an EDX line analysis over a plurality of stripes of a coating.

FIG. 6 shows by way of example the result of an EDX line analysis of a 1 mm-long section of an unannealed strip sample from embodiment J. This example has a striped coating. The EDX line analysis was carried out across a plurality of coating strips. As the penetration depth of the EDX analysis is significantly greater than the layer thickness, which is in the region of a few µm, there is always still a significant fraction of Fe, Co and V even in the coated regions. The elements Fe, Co and V are basic components of the VACOFLUX X1 alloy and can be attributed to it, while the elements Al and O appear in the coating only. The Al content here is clearly attributable to the boehmite, which is provided in the embodiments by the DISPERAL HP 14/7 component. If the coating according to the invention is applied to an alloy with an Al content, it is also alternatively possible to use the O content to determine the coated regions.

FIG. 6 shows the maximum values (1) for the Al or O content, which appear visually as white stripes. The minimum values (2) correspond to the regions with no notable coating fraction, i.e. to the gaps in which the metallic surface of the basic material can easily be identified in a light microscope.

In this example, the width of the stripes is up to 200 µm and can be varied in a targeted manner depending on the squeeze roller profile used in the coating process. The width of the gaps is in the region of 100 µm.

In a further embodiment the width of the stripes is 400 µm and the width of the gaps is 300 µm.

The embodiments show clearly that the exposed surface is one criterion for the formation of good or very good magnetic characteristics. It is necessary to find a compromise between adequate layer separation, which requires the most extensive coating possible, and adequate exposed surface for magnetic final annealing, which is necessary for good magnetic values.

Whether the coating formed is extensive or limited is determined essentially by the structural viscosity of the coating solution. The appearance of the coating in any given case, i.e. whether there are straight stripes, ramified structures or network patterns, will depend on a variety of other boundary conditions such as the profile depth and groove spacing of the profile rollers, the contact pressure of the rollers or the strip speed.

The applicability of the coating is not restricted to the alloy or Fe—Co alloys specified in the example.

Only the presence of the $\alpha \rightarrow \alpha+\gamma \rightarrow \gamma$ phase transitions is required to set the cube-face texture, i.e. the ferritic material must be annealed in the austenitic $\gamma$ region during the dwell step. It is assumed that adsorbed foreign atoms such as sulphur diffused from the material, for example, modify the surface energies of the crystals such that the (001) orientations with the cube edge in the sheet plane are more favourable in energy terms than the (111) orientations with the space diagonal in the sheet plane and are so more likely to form. As a result, the coating must not cover the entire surface if the foreign atoms are to be able to attach to the surface. Depending on the width of the two-phase region, the composition, rinsing and thermal conditions, parameters such as dwell temperature and heating and cooling rates must be adapted during the passage through the two-phase region $\alpha+\gamma$.

Further compositions in which variations of the coating according to the invention allow annealing in the $\gamma$ region and so the formation of the cube-face texture include, for example:

pure irons, i.e. alloys made up of at least 99.5 wt % Fe and smelting-induced impurities, FeSi alloys with up to 5 wt % Si and Co alloys, i.e. the composition range Fe, 2 wt %≤Co≤10 wt %, 0.05 wt %≤Mn≤5 wt %, 0.05 wt %≤Si≤5 wt %, optionally up to 3 wt % Cr, up to 2 wt % V, up to 1 wt % Ni, up to 0.05 wt % Nb and up to 0.02 wt % C, as disclosed in US 2016/0329139A1, one composition from this region is Fe, 5.0 wt % Co, 2.3 wt % Si, 1.0 wt % Mn, 0.3 wt % Cr, 0.005 wt % C, available under the trade name HYPOCORE.

FeCo alloys with Co contents of between 20 and 30 wt %, i.e. the composition range Fe, 20 wt %≤Co≤30 wt %, 0 wt %≤Cr≤0.6 wt %, 0.06 wt %≤(Nb+Ta)≤0.8 wt %, 0 wt %≤(Si+Mn)≤0.5 wt %, 0 wt %≤Ce≤0.01 wt %, up to 1 wt % each of Ni, Al, V, Mo, up to 0.1 wt % each of Zr, Ti, Cu, up to 0.02 wt % O, up to 0.01 wt % of W, S, N, P, C, B, as disclosed in DE 10 2014 100 589 A1 and commercially available from Vacuumschmelze GmbH & Co. KG, Hanau, Germany under the trade name VACOFLUX 27.

FeSi with up to approx. 1.9 wt % Si, as there is still a two-phase region $\alpha+\gamma$ up to this content.

A further area of application is ferritic alloys with no $\alpha \rightarrow \alpha+\gamma \rightarrow \gamma$ phase transition in which the formation of a cube face or cube texture can only be triggered by secondary recrystallisation, as disclosed in DE1029845, for example. Examples are FeSi alloys with 2% to 5 wt % silicon and aluminium. Here, once again, the modification of the surface energy by foreign atoms is the prerequisite for the preferred formation of the cube texture. While the model for the formation of the texture has been known for a long time, the coating according to the invention allow commercial use as the mechanism is not suppressed.

Possible appropriate composition ranges include, for example:

FeSi alloys with 2% to 4.5 wt % (Si+Al). The two-phase region α+γ is constricted and the γ phase suppressed owing to the high Si fraction. Examples include all common electrical steels, in which Al is still often substituted for up to 1 wt % Si. One example is the alloy with the trade name TRAFOPERM N4 that has 2.4 wt % Si, 0.35 wt % Al and up to 0.2 wt % Mn and is commercially available from Vacuumschmelze GmbH & Co KG, Hanau, Germany.

FeSi alloys with 4% to 7 wt % Si, optionally also further additions such as 0.1 wt %≤(Cr and/or Mo)≤7 wt %, 0.1 wt %≤(Co and/or Ni)≤10 wt %, up to 7 wt % Al, Mn, Cu, Ge, Ga, up to 7 wt % Ti, V, Hf, Nb, W, up to 1 wt % B, Zr, Mg, P, Ce, as disclosed in US 2018/0336982 A1.

A strip having the coating according to the invention can be processed further in various manners. The laminated cores typically produced for electric motors or generator have a variety of sheets (laminations) that are stacked one on top of another. Here the term laminated core may refer to a stator or rotor geometry, but also to a component thereof, e.g. to a stator segment, an individual stator tooth or a stator ring into which stator teeth are inserted.

One exemplary production route is the manufacture of individual lamination sheets that are joined together to form a laminated core. This route is well suited to small to medium-sized quantities. The production process comprises the following:

providing a strip at final thickness,
partially coating the strip with the composition according to the invention,
forming the lamination sheets from the strip by punching or laser cutting, for example,
annealing the lamination sheets, preferably in a stack with a covering plate to weight them down,
joining the lamination sheets by gluing or laser welding, for example, to form a laminated core.

In another example the individual lamination sheets are first joined together, and the assembled laminated core is then annealed:

providing a strip at final thickness,
partially coating the strip with the composition according to the invention,
forming the lamination sheets from the strip by punching or laser cutting, for example,
joining the lamination sheets by laser welding, for example, to form a laminated core,
annealing the laminated core, weighted down as required In a further example the lamination sheets are formed and joined together to form the laminated core in a combined step:

providing a strip at final thickness,
partial coating the strip with the composition according to the invention,
forming the lamination sheets and joining them in-die stacking to form a laminated core,
annealing the laminated core, weighted down as required.

In all the embodiments, the laminations sheets should not fuse together during annealing. Therefore the coating is applied to ensure layer separation.

The partial covering of the surface explained in the preferred variants and in the examples can be quantified in various manners.

In a purely visual examination, the coated regions are characterised by the fact that the metallic gleam of the strip surface can no longer be seen. In the unannealed state these regions appear whitefish; in the annealed state they appear white to brown. Depending on the manner of application, there are always regions that are only very lightly covered with aluminium oxide particles, for example the gaps between thick, clearly covered regions or an extensive base coat that lies over the strip like a veil. Visually, these regions are characterised by the fact that they appear dull before annealing and that the metal surface is still visible below them. As the coverage is so low in these regions, this residual fraction of coating does not stand in the way of the formation of a cube-face texture and is not therefore assessed as being covered.

Quantification of the surface covering using metallographic methods, i.e. with a microscope, is also possible, for example using a line method or by computer-based area analysis. However, this method may be very time consuming if there is not a clear colour separation between coated and uncoated regions so that many regions have to be evaluated by hand.

Figure 1:
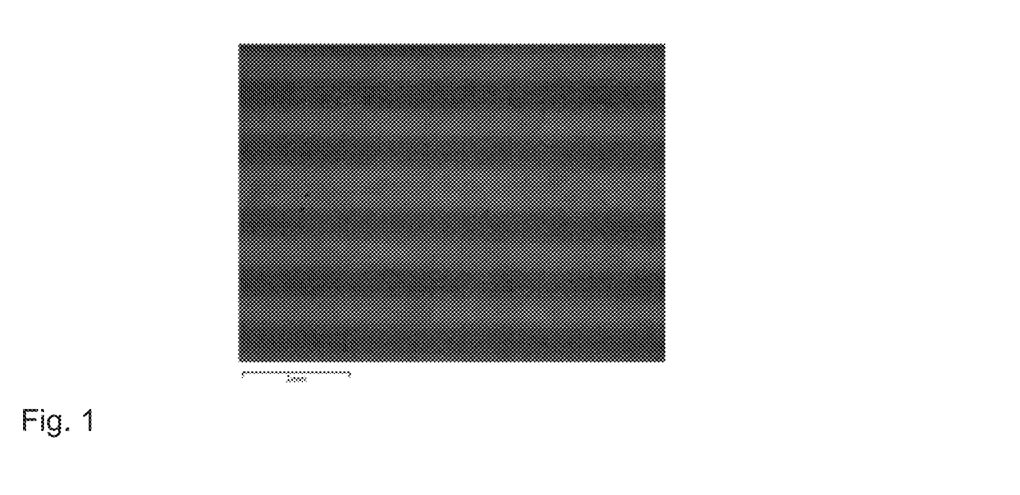
FIG. 1 shows an SEM image of a sample with a structured coating.

Quantification using an electron scanning microscope is also possible. FIG. 1 shows an SEM (Scanning Electron Microscope) image of a strip made of a soft magnetic alloy, to the surface of which a structured coating representing a striped structure, like that seen in embodiment D, has been applied. The light regions correspond to uncoated gaps, the dark regions to the coated stripes.

Figure 2:
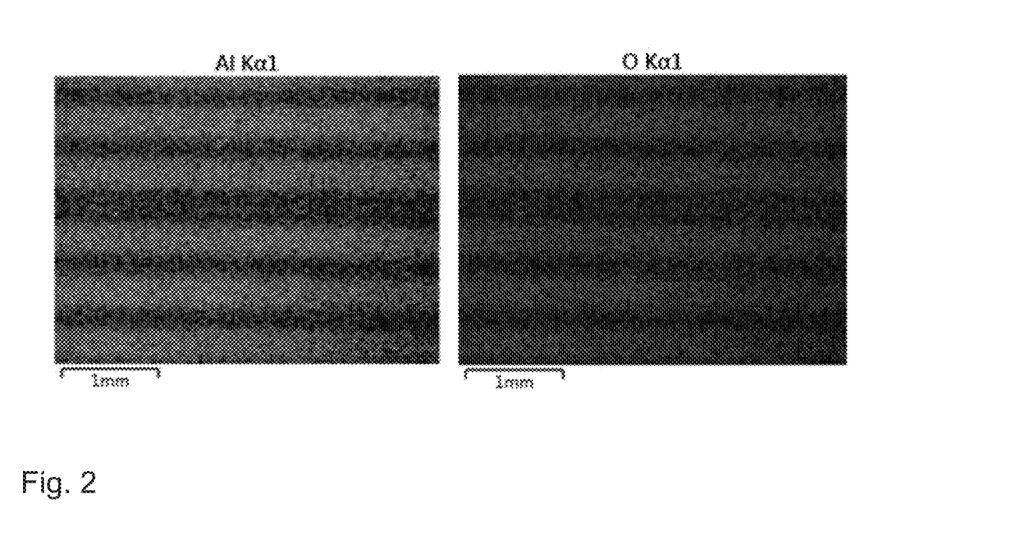
FIG. 2 shows EDX element maps of a sample with a structured coating.

A clearer assignment can be achieved by means of EDX element mapping. Here, in the specific case of VACOFLUX X1, coverage with oxygen and aluminium can be used as an indicator for aluminium oxide since neither element is contained in the basic alloy. FIG. 2 shows an example of this type of element mapping for the same sample D. Here, the light regions correspond to the coated regions, while the dark regions have almost no aluminium or oxygen. The lightness is not an indicator of the concentration; it simply indicates a higher density of aluminium oxide particles. An $Al_2O_3$ surface covering of 56% was determined on the basis of this image.

In one embodiment an $Al_2O_3$ surface covering of 30% is determined on a further sample according to the invention with a ceramic fraction of 4% in the coating solution. In a further sample not according to the invention, in contrast, the surface coverage measured did not exceed 19%. Although this sample was characterised by very good magnetic characteristics after final annealing, layer separation was inadequate, and the sheets made from it that were in contact with one another during annealing fused together at certain points or over certain areas.

FIG. 3 shows exemplary images of surface patterns, examples a and b showing reference states and the other examples being surfaces according to the invention.

Example a shows a sheet with no coating. While the formation of a cube-face texture is possible here, uncoated sheets cannot be annealed without further processing because they fuse together at the high temperatures used, typically above 900° C.

Example b shows a discontinuous extensive coating. This corresponds to coatings such as HITCOAT and DL1. While it is also possible to achieve very good layer separation with final annealing in the γ-region with this type of coating, it is impossible to form a significant fraction of cube-face texture.

Example c shows a striped structure. The dark stripes correspond to regions with a very dense covering of Al-containing particles. The light regions between the stripes contain no or very few particles, and these layers therefore typically appear transparent. Naturally, binding agent also occurs in the intermediate regions in the unannealed state.

Example d also shows a striped structure. The dark stripes enriched with Al particles are narrower than those shown in example c. This permits an exceptional formation of cube-face structure but increases the risk of sheet adherence due to annealing Example e shows a grid structure in which the lines run diagonally to the strip direction.

Example f shows a coating in which local accumulations of particles have formed surrounded by exposed areas. The particles are bonded before annealing so that the coating adheres.

Example g shows in schematic form the appearance of a coating that has actually been applied. The dispersion used for the coating had a lower viscosity than that used in examples c and d and the coating therefore had more time to run laterally after application. The result is a striped pattern with ramifications. This image also shows that in practice the exposed areas, which appear completely white in this idealised view, still contain a fraction of fine Al particles. However, the concentration in these regions is very small compared to the thick stripes.

Example h shows a grid structure in which the lines run parallel or at an angle to the strip direction.

In summary, a water-based alkaline composition is provided and used to form an insulating layer of an annealing separator. A soft magnetic alloy with a coating of this water-based alkaline composition is also provided. In particular, the composition can be applied to the surface of the alloy with a defined structure or a pattern so that parts of the surface are free of the coating. As a result, it is possible during appropriate heat treatment in the FCC-phase region to form a {100}<uvw> texture and at the same time to suppress the fraction of a {111}<uvw> texture. In this way, it is possible to produce a soft magnetic alloy with good magnetic properties.

The invention claimed is:

1. A water-based alkaline composition for forming an insulating layer of an annealing separator on a soft magnetic alloy, comprising:
   ceramic particles with an average particle size of less than 0.5 μm, the ceramic particles including a chemically surface modified boehmite, and
   at least one polymer dispersion as a binding agent, the at least one polymer dispersion including one or more polymerisate selected from the group consisting of acrylate polymers, methacrylate polymers, and hydroxylated cellulose ether,
   water, and
   a pH corrector in an amount which allows the composition to have a pH value of between 8 and 12.

2. A composition according to claim 1, wherein the at least one polymer dispersion comprises at least one of the methacrylate polymers including methacrylic acid ester and optionally at least one of the acrylate polymers including acrylic acid ester.

3. A composition according to claim 1, wherein the average particle size lies between 10 nm and 300 nm.

4. A composition according to claim 1, further comprising at least one rheological additive, wherein the at least one rheological additive contains a hydroxylated cellulose ether.

5. A composition according to claim 1, wherein the composition further includes at least one rheological additive.

6. A composition according to claim 1 further comprising a water-soluble alkanolamine.

7. A composition according to claim 1, wherein the pH corrector is aqueous ammonia.

8. A composition according to claim 1, wherein the pH value of the composition is between 9 and 11.

9. A composition according to claim 4, wherein the at least one rheological additive is in an amount which allows the composition to have a viscosity of greater than 100 Pa*s.

10. A composition according to claim 5, wherein the at least one polymer dispersion includes an acrylate polymer and a methacrylate polymer; and said at least one rheological additive includes a hydroxylated cellulose ether.

11. A composition according to claim 10, wherein the hydroxylated cellulose ether is an amount which allows the composition to have a viscosity of greater than 100 Pa*s.

12. A composition according to claim 6, wherein the water-soluble alkanolamine is 2-amino-2-ethyl-1,3-propanediol or 2-amino-2-methyl-1,3-propanediol.

13. A coated soft magnetic alloy, wherein the soft magnetic alloy includes surface regions, the surface regions are provided with a coating, the coating has a maximum thickness of 1 μm to 15 μm, and a composition according to claim 1, and wherein the soft magnetic alloy has the form of a strip.

14. A coated soft magnetic alloy according to claim 13, wherein the soft magnetic alloy is completely covered by the coating.

15. A coated soft magnetic alloy according to claim 13, wherein 20% to 80%, of a total surface of the soft magnetic alloy is free of the coating.

16. A coated soft magnetic alloy according to claim 13, wherein the soft magnetic alloy comprises an alloy selected from the group consisting of iron alloys with at least 99.5 wt % Fe and smelting-induced impurities, FeSi alloys with up to 5 wt % Si, NiFe alloys with 30 to 82 wt % Ni, and FeCo alloys with a Co content of between 4 wt % and 50 wt %.

17. A coated soft magnetic alloy according to claim 15, wherein the coating is arranged on the soft magnetic alloy in the form of a pattern, the pattern including stripes, dots, a network, or a grid.

18. A coated soft magnetic alloy according to claim 17, wherein a maximum width of the coated surface regions is less than 2 mm.

19. A method for producing a coated soft magnetic alloy, the method comprising:
   providing a soft magnetic alloy,
   coating the soft magnetic alloy with the water-based alkaline composition according to claim 1, and
   heat treating the coated soft magnetic alloy, the coating forming an insulating layer.

20. A method according to claim 19, wherein the soft magnetic alloy is coated by applying a structure, the structure being formed by a pattern of stripes, dots, a network, or a grid, and between 20% and 80% of the total surface of the soft magnetic remaining free of the coating.

21. A method according to claim 19, wherein the alloy has the form of a strip and the method further comprises forming a plurality of individually coated laminations made from the coated strip by cutting, punching or laser cutting.

22. A method according to claim 19, wherein the soft magnetic alloy is heat treated at a temperature of above 650° C.

23. A method according to claim 19, wherein the soft magnetic alloy has a composition consisting essentially of:

| 5 wt % | ≤ | Co | ≤ | 25 wt % |
| 0.3 wt % | ≤ | V | ≤ | 5.0 wt % |

-continued

| | | | | |
|---|---|---|---|---|
| 0 wt % | ≤ | Cr | ≤ | 3.0 wt % |
| 0 wt % | ≤ | Si | ≤ | 3.0 wt % |
| 0 wt % | ≤ | Mn | ≤ | 3.0 wt % |
| 0 wt % | ≤ | Al | ≤ | 3.0 wt % |
| 0 wt % | ≤ | Ta | ≤ | 0.5 wt % |
| 0 wt % | ≤ | Ni | ≤ | 0.5 wt % |
| 0 wt % | ≤ | Mo | ≤ | 0.5 wt % |
| 0 wt % | ≤ | Cu | ≤ | 0.2 wt % |
| 0 wt % | ≤ | Nb | ≤ | 0.25 wt % |
| 0 wt % | ≤ | Ti | ≤ | 0.05 wt % |
| 0 wt % | ≤ | Ce | ≤ | 0.05 wt % |
| 0 wt % | ≤ | Ca | ≤ | 0.05 wt % |
| 0 wt % | ≤ | Mg | ≤ | 0.05 wt % |
| 0 wt % | ≤ | C | ≤ | 0.02 wt % |
| 0 wt % | ≤ | Zr | ≤ | 0.1 wt % |
| 0 wt % | ≤ | O | ≤ | 0.025 wt % |
| 0 wt % | ≤ | S | ≤ | 0.015 wt % | the rest iron, where Cr+Si+Al+Mn≤3.0 wt %, and up to 0.2 wt % of other smelting-induced impurities, wherein the soft magnetic alloy comprises a phase transition from a BCC-phase region to a mixed BCC/FCC region to an FCC-phase region, wherein as the temperature increases the phase transition between the BCC-phase region and the mixed BCC/FCC region takes place at a first transition temperature $T\alpha/\alpha+\gamma$ and as the temperature increases further the transition between the mixed BCC/FCC region and the FCC-phase region takes place at a second transition temperature $T\alpha+\gamma/\gamma$, where $T\alpha+\gamma/\gamma > T\alpha/\alpha+\gamma$ and the difference $T\alpha+\gamma/\gamma - T\alpha/\alpha+\gamma$ being less than 45K, and wherein the heat treatment comprises:
heating up the soft magnetic alloy and then
heat treating the soft magnetic alloy in a first step for a total time t1, in this first step the soft magnetic alloy being heat treated at a temperature in a temperature range of between $T\alpha+\gamma/\gamma$ and T1, and then
cooling the soft magnetic alloy to room temperature,
or
heating up the soft magnetic alloy and then
heat treating the soft magnetic alloy in a first step for a total time t1, in this first step the soft magnetic alloy being heat treated at a temperature in a temperature range of between $T\alpha+\gamma/\gamma$ and T1 and then
cooling the soft magnetic alloy to a temperature T2, and then
heat treating the soft magnetic alloy in a second step at temperature T2 for a time t2 and then
cooling the soft magnetic alloy to room temperature,
wherein the heat treatment is carried out at least partially in a hydrogen-containing atmosphere, in the process the exposed parts of the surface of the primary product being in direct contact with the hydrogen-containing atmosphere, where T1>T2, T1 is above $T\alpha+\gamma/\gamma$ and T2 is below $T\alpha/\alpha+\gamma$.

24. A method according to claim 20, wherein the coating is applied to the soft magnetic alloy using profile rollers.

25. A method according to claim 21, wherein the laminations are stacked to form a stack and the stack is heat treated.

26. A method according to claim 21, wherein the laminations are joined together to form a laminated core, the laminations being joined together to form a laminated core by welding, laser welding or in-die stacking, and the laminated core is heat treated.

* * * * *